(12) United States Patent
Nakamura et al.

(10) Patent No.: US 12,190,237 B2
(45) Date of Patent: Jan. 7, 2025

(54) PATTERN RECOGNITION DEVICE AND LEARNED MODEL

(71) Applicant: NTT DOCOMO, INC., Chiyoda-ku (JP)

(72) Inventors: Issei Nakamura, Chiyoda-ku (JP); Toshiaki Sugimura, Chiyoda-ku (JP); Hayato Akatsuka, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 955 days.

(21) Appl. No.: 17/267,890

(22) PCT Filed: Jul. 12, 2019

(86) PCT No.: PCT/JP2019/027775
§ 371 (c)(1),
(2) Date: Feb. 11, 2021

(87) PCT Pub. No.: WO2020/070943
PCT Pub. Date: Apr. 9, 2020

(65) Prior Publication Data
US 2021/0166063 A1 Jun. 3, 2021

(30) Foreign Application Priority Data
Oct. 3, 2018 (JP) .................................. 2018-188160

(51) Int. Cl.
*G06N 3/08* (2023.01)
*G06F 18/21* (2023.01)
(Continued)

(52) U.S. Cl.
CPC ........... *G06N 3/08* (2013.01); *G06F 18/2113* (2023.01); *G06F 18/217* (2023.01); *G06N 20/00* (2019.01); *G06V 10/56* (2022.01); *G06V 10/774* (2022.01)

(58) Field of Classification Search
CPC .......... G06N 3/08; G06N 20/00; G06V 10/56; G06V 10/774; G06F 18/217; G06F 18/2113
(Continued)

(56) References Cited

U.S. PATENT DOCUMENTS

| 6,671,403 B1 | 12/2003 | Takasu et al. |
| 2005/0102246 A1* | 5/2005 | Movellan ............. G06V 40/165 382/118 |
| 2019/0231094 A1* | 8/2019 | Pan ...................... G06Q 20/208 |

FOREIGN PATENT DOCUMENTS

JP          9-81730 A       3/1997

OTHER PUBLICATIONS

International Search Report issued on Aug. 20, 2019 in PCT/JP2019/027775 filed on Jul. 12, 2019, 2 pages.
(Continued)

*Primary Examiner* — Tsu-Chang Lee
(74) *Attorney, Agent, or Firm* — Oblon, McClelland, Maier & Neustadt, L.L.P.

(57) ABSTRACT

A pattern recognition device (10) includes an acquisition unit (13) configured to acquire a plurality of recognition candidates obtained by pattern recognition for an input image and having a recognition score, a calculation unit (17) configured to calculate an evaluation value obtained by quantifying a possibility of a recognition candidate (K) being correct answer data corresponding to the input data on the basis of a feature quantity regarding a recognition candidate (A1) and the recognition candidate (K), for each pair of the recognition candidate (A1) having the number one recognition score and another recognition candidate (K) among the plurality of recognition candidates, and a determination unit (18) configured to determine a final recognition result from among the plurality of recognition candi-
(Continued)

dates on the basis of an evaluation value for each recognition candidate (K).

6 Claims, 10 Drawing Sheets

(51) Int. Cl.
  *G06F 18/2113* (2023.01)
  *G06N 20/00* (2019.01)
  *G06V 10/56* (2022.01)
  *G06V 10/774* (2022.01)
(58) Field of Classification Search
  USPC .......................................................... 706/12
  See application file for complete search history.

(56) References Cited

OTHER PUBLICATIONS

International Preliminary Report on Patentability and Written Opinion issued Apr. 15, 2021 in PCT/JP2019/027775 (submitting English translation only), 7 pages.

* cited by examiner

PATTERN RECOGNITION DEVICE AND LEARNED MODEL

TECHNICAL FIELD

One aspect of the present invention relates to a pattern recognition device and a learned model.

BACKGROUND ART

In the related art, a system that outputs a recognition candidate suitable for an input unknown pattern (for example, a voice and an image) from among patterns stored in a recognition dictionary prepared in advance is known.

For example, Patent Literature 1 discloses a pattern recognition device that enables recognition candidates obtained using respective recognition schemes to be arranged in an appropriate order when recognition candidates obtained by applying a plurality of different recognition schemes to an unknown pattern that is a recognition target are integrated and output. Specifically, the pattern recognition device converts a recognition score of each recognition candidate obtained using a plurality of recognition schemes to a degree of correctness according to a scale common to a plurality of types of recognition schemes to appropriately order each recognition candidate.

CITATION LIST

Patent Literature

[Patent Literature 1] Japanese Unexamined Patent Publication No. H9-81730

SUMMARY OF INVENTION

Technical Problem

However, in the pattern recognition device, an order of recognition candidates obtained using a certain recognition processing scheme is maintained. That is, a ranking does not change between a recognition candidate having the number one recognition score and recognition candidates having the number two or smaller recognition scores in a certain recognition processing scheme. Therefore, in the pattern recognition device, when the recognition candidates having the number two or smaller recognition scores are correct answer data corresponding to an unknown pattern serving as a recognition target, the recognition candidate corresponding to the correct answer data cannot be obtained as a final recognition result (number one recognition result). Therefore, the pattern recognition device has room for improvement in achieving improvement of recognition accuracy.

Therefore, an object of an aspect of the present invention is to provide a pattern recognition device and a learned model capable of achieving improvement of recognition accuracy.

Solution to Problem

A pattern recognition device according to an aspect of the present invention includes an acquisition unit configured to acquire a plurality of recognition candidates obtained by pattern recognition for input data and having respective recognition scores indicating certainty of recognition; a calculation unit configured to calculate an evaluation value obtained by quantifying a possibility of a second recognition candidate being correct answer data corresponding to the input data on the basis of a feature quantity regarding a first recognition candidate and the second recognition candidate, for each pair of the first recognition candidate being a recognition candidate having the number one recognition score and the second recognition candidate being another recognition candidate among the plurality of recognition candidates; and a determination unit configured to determine a final recognition result from among the plurality of recognition candidates on the basis of the evaluation value for each of the second recognition candidates calculated by the calculation unit.

In the pattern recognition device, an evaluation value obtained by quantifying a possibility of the second recognition candidate being the correct answer data is calculated for each pair of the first recognition candidate and the second recognition candidate. That is, the evaluation value of each of the second recognition candidates is calculated as an index indicating whether or not a possibility of the second recognition candidate being the correct answer data is higher than a possibility of the first recognition candidate being the correct answer data (in other words, whether or not it is better to change the position of the first recognition candidate and the position of the second recognition candidate). The final recognition result is determined from among the plurality of recognition candidates on the basis of the evaluation value of the second recognition candidate. With this configuration, the ranking of the plurality of recognition candidates are appropriately corrected on the basis of the evaluation value of each recognition candidate instead of the ranking based on the recognition score being determined as it is as a final ranking of the plurality of recognition candidates, and then, the final recognition result can be determined. Therefore, with the pattern recognition device, it is possible to achieve improvement of the recognition accuracy.

A learned model according to an aspect of the present invention is a learned model for causing a computer to function to receive a feature quantity regarding a first recognition candidate and a second recognition candidate selected from among a plurality of recognition candidates obtained by pattern recognition for input data, and output an evaluation value obtained by quantifying a possibility of the second recognition candidate being one of the recognition candidates being correct answer data corresponding to the input data, wherein the learned model is generated by executing machine learning using learning data in which a feature quantity regarding two recognition candidates obtained by the pattern recognition for recognition target data are explanatory variables and an index value indicating whether one of the two recognition candidates is correct answer data corresponding to the recognition target data is an objective variable.

According to the learned model, an evaluation value for appropriately correcting a ranking (a ranking based on the recognition score) of the plurality of recognition candidates obtained by pattern recognition for the input data is obtained. Therefore, according to the learned model, it is possible to achieve improvement of the recognition accuracy.

Advantageous Effects of Invention

According to an aspect of the present invention, it is possible to provide a pattern recognition device and a learned model capable of improving recognition accuracy.

DESCRIPTION OF EMBODIMENTS

Hereinafter, an embodiment of the present invention will be described in detail with reference to the accompanying drawings. In description of the drawings, the same or corresponding elements are denoted by the same reference signs, and repeated description will be omitted.

Figure 1:
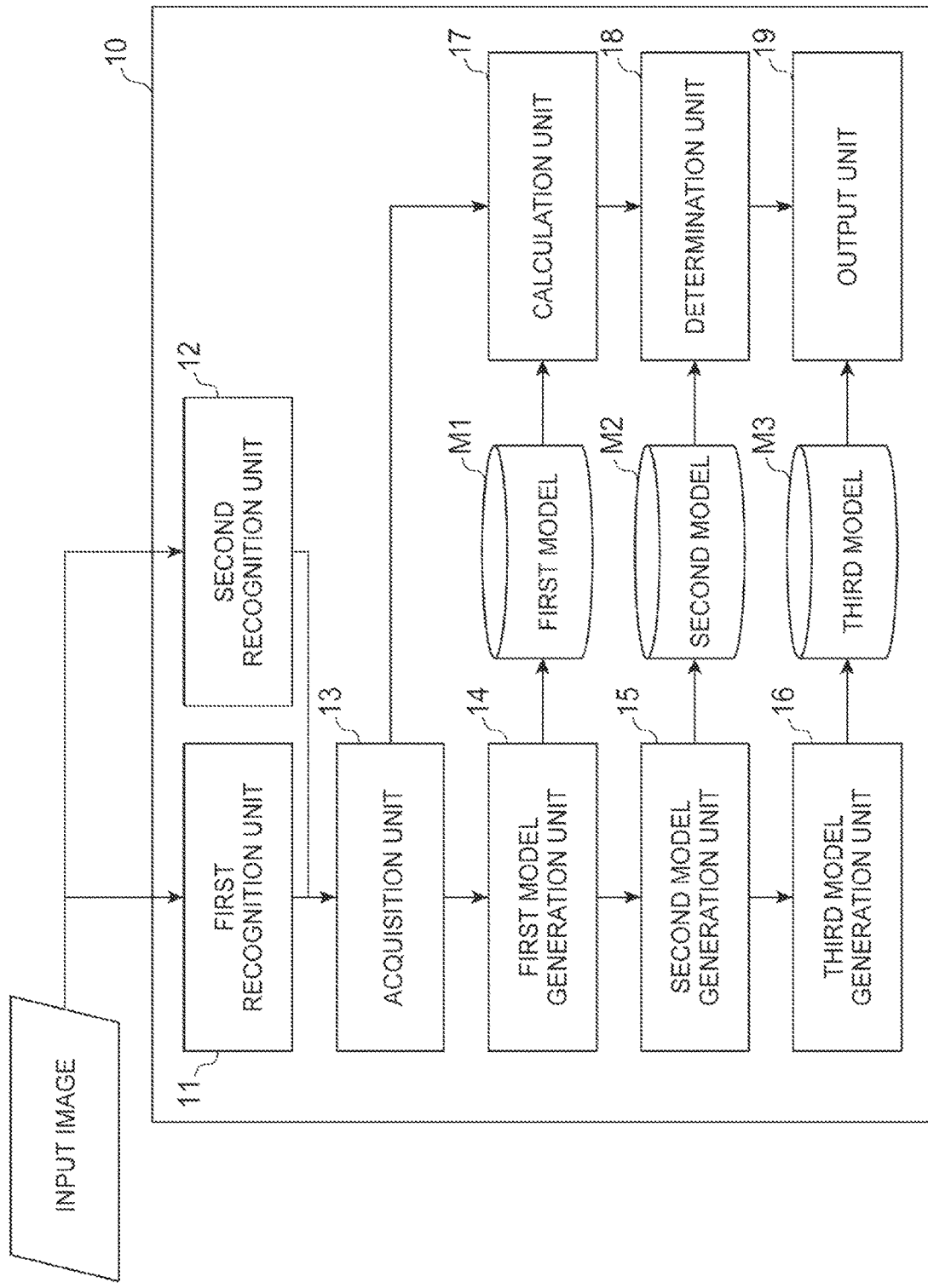
FIG. 1 is a block diagram illustrating a functional configuration of a pattern recognition device according to an embodiment.

FIG. 1 is a block diagram illustrating a functional configuration of a pattern recognition device 10 according to an embodiment. The pattern recognition device 10 is a computer system that acquires image data as input data and recognizes (identifies or specifies) an object included in the image data. For example, the image data includes a certain product (for example, daily necessities such as foods, beverages, and toiletries) as a subject. The pattern recognition device 10 determines a dictionary image estimated to be correct answer data corresponding to input image data, as a final recognition result, from among dictionary images (image databases) prepared for each product in advance, and outputs the dictionary image. Here, when the image data includes a product A as a subject, correct answer data corresponding to the image data is a dictionary image registered as an image of the product A in advance. In this case, when a dictionary image of the product A is output as the final recognition result, the image data has been correctly recognized.

In the embodiment, the pattern recognition device 10 is configured to execute both a learning process and a recognition process. The learning process is a process of generating learned models (in the embodiment, a first model M1, a second model M2, and a third model M3) through machine learning. The recognition process is a process of recognizing an object (product) included as a subject in image data serving as a recognition target (hereinafter also referred to as an "input image") by using a learned model generated through a learning process. Such an input image is obtained by, for example, imaging a product serving as a recognition target using a camera function of a terminal such as a smartphone or a tablet.

As illustrated in FIG. 1, the pattern recognition device 10 includes a first recognition unit 11, a second recognition unit 12, an acquisition unit 13, a first model generation unit 14, a second model generation unit 15, a third model generation unit 16, a calculation unit 17, a determination unit 18, and an output unit 19. The learning process is executed by the first recognition unit 11, the second recognition unit 12, the acquisition unit 13, the first model generation unit 14, the second model generation unit 15, and the third model generation unit 16. The recognition process is executed by the first recognition unit 11, the second recognition unit 12, the acquisition unit 13, the calculation unit 17, the determination unit 18, and the output unit 19.

Each of the first recognition unit 11 and the second recognition unit 12 outputs the plurality of recognition candidates by executing pattern recognition for the input image (image recognition in the embodiment). Each of the plurality of recognition candidates has identification information for uniquely specifying the recognition candidate (for example, an image ID for specifying a dictionary image), and a recognition score indicating the certainty of the recognition. The first recognition unit 11 executes a first pattern recognition. The second recognition unit 12 executes a second pattern recognition different from the first pattern recognition. Each of the first recognition unit 11 and the second recognition unit 12 may include an image database that stores a dictionary image prepared for each product in advance, and a recognition engine that compares the feature quantity extracted from the input image with the feature quantity of each dictionary image to extract a plurality of recognition candidates (for example, top n recognition candidates) having a high degree of similarity to the input image.

The first pattern recognition executed by the first recognition unit 11 is a scheme for extracting a feature quantity (feature point) from a grayscale image obtained by performing grayscale conversion on the input image, and recognizing an object included in the input image on the basis of the feature quantity. For example, the first pattern recognition is a recognition algorithm that is so-called specific object recognition, and the object included in the input image is recognized on the basis of a local feature quantity extracted from the grayscale image. In such first pattern recognition, it is possible to reduce the number of dimensions of the feature quantity by not including color information (for example, RGB values) as the feature quantity. Therefore, there is an advantage that the object included in the input image can be relatively accurately recognized at a relatively high speed and with a small number of dictionary images (for example, one dictionary image per product). On the other hand, the first pattern recognition has a disadvantage that it is difficult to accurately recognize (identify) products having the same design in different colors since the color information is not included as the feature quantity.

The second pattern recognition executed by the second recognition unit 12 is a scheme for recognizing an object included in the input image on the basis of the feature quantity including color information of the input image. For example, in the second pattern recognition, object recognition (similar image search) is executed by using a neural network such as a convolutional neural network (CNN) constructed by deep learning as the recognition engine. Since the second pattern recognition includes color information as a feature quantity, the second pattern recognition has an advantage that it is possible to accurately recognize products having the same design in different colors (for example, products of the same brand having different attributes (taste, scent, and the like)), as compared with the first pattern recognition described above. On the other hand, there is a disadvantage that it is necessary to construct the neural network using a large number of pieces of learning data (about several hundred learning images per product) in order to increase recognition accuracy of the second pattern recognition to the same accuracy as that of the first pattern recognition.

The acquisition unit 13 acquires the plurality of recognition candidates obtained by the pattern recognition for the input image. As described above, each recognition candidate has an image ID and a recognition score. That is, the image ID and the recognition score are associated with each recognition candidate. In the embodiment, as an example, the acquisition unit 13 acquires, for a certain input image, a plurality of recognition candidates (in this case, the top n candidates A1 to An in order of the recognition score) obtained by the first recognition unit 11 (the first pattern recognition), and a plurality of recognition candidates (in this case, the top in recognition candidates B1 to Bm in order of the recognition score except for recognition candidates overlapping the recognition candidates A1 to An) obtained by the second recognition unit 12 (the second pattern recognition), as the plurality of recognition candidates. Here, n and m are values arbitrarily determined in advance. In the embodiment, the recognition candidates B1 to Bm (recognition candidates not overlapping with the recognition candidates A1 to An) obtained by the second pattern recognition are acquired as recognition candidates for complementing the recognition candidates A1 to An obtained by the first pattern recognition. The acquisition unit 13 acquires a recognition candidate sequence in which the recognition candidates A1 to An and the recognition candidates B1 to Bm are arranged in this order.

Figure 2:
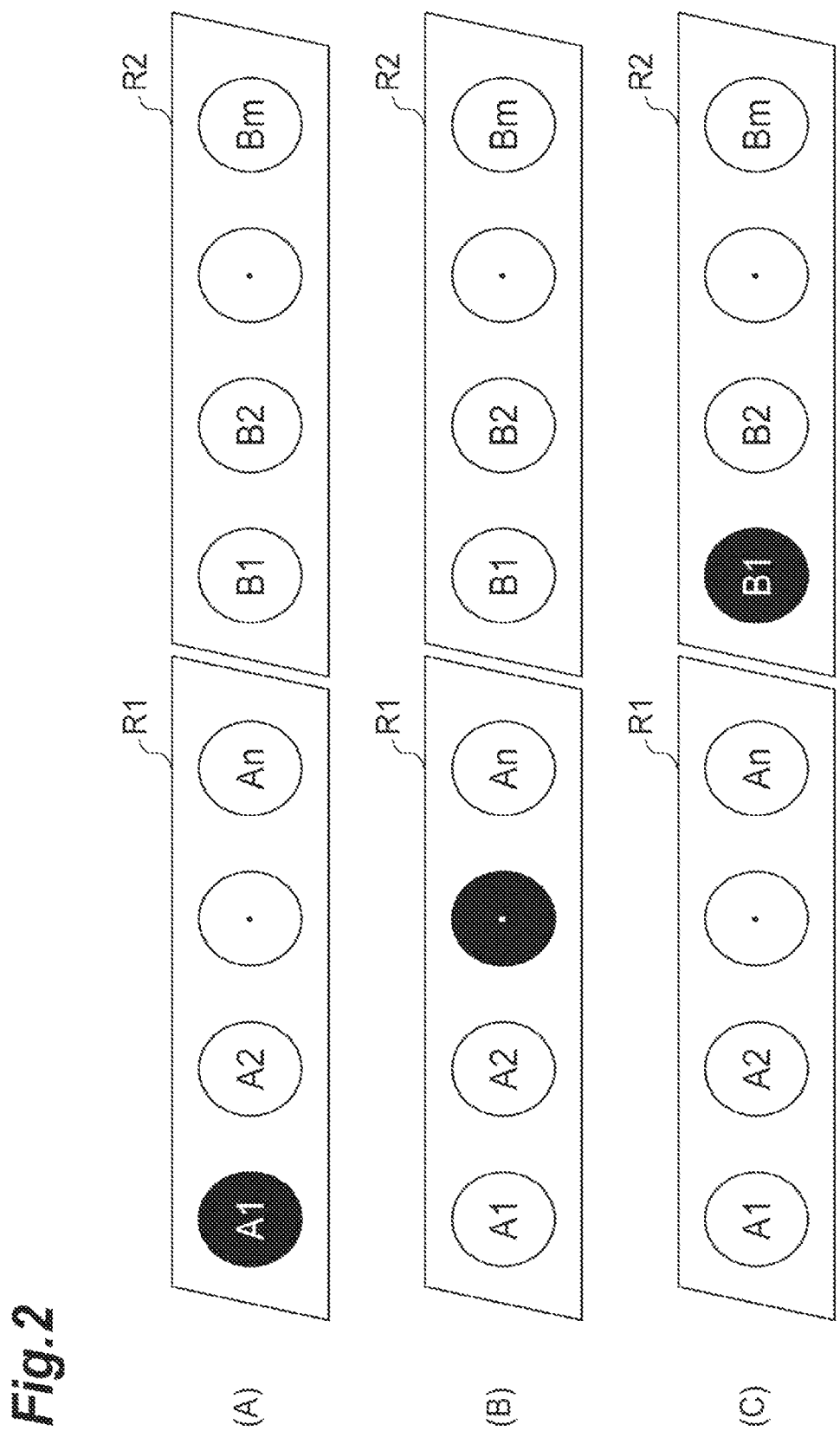
FIG. 2 is a diagram illustrating an example of a recognition candidate sequence that is acquired by an acquisition unit.

FIG. 2 is a diagram schematically illustrating an example of a recognition candidate sequence (m+n recognition candidates) acquired by the acquisition unit 13. In FIG. 2, a recognition candidate sequence R1 is a sequence in which the recognition candidates A1 to An obtained by the first pattern recognition are arranged in the order of the recognition score, and a recognition candidate sequence R2 is a sequence in which the recognition candidates B1 to Bm obtained by the second pattern recognition are arranged in the order of the recognition score. Further, in FIG. 2, black recognition candidates are the correct answer data corresponding to the input image.

FIG. 2(A) illustrates an example in which the number one recognition candidate A1 (a recognition candidate having the number one (highest) recognition score) in the first pattern recognition is correct answer data. That is, FIG. 2(A) illustrates an example (a positive example) in which a correct recognition result is obtained by the first pattern recognition.

On the other hand, FIG. 2(B) illustrates an example in which the number two or smaller recognition candidates in the first pattern recognition are correct answer data. Further, FIG. 2(C) illustrates an example in which a complementing candidate (in this case, as an example, a recognition candidate B1) obtained by the second pattern recognition is correct answer data. That is, FIGS. 2(B) and 2(C) illustrate examples in which the correct recognition result is not obtained by the first pattern recognition (that is, an example in which the recognition candidate A1 is not correct answer data (negative example)).

The first model generation unit 14 generates the first model M1 to be used for update of a recognition ranking of the recognition candidate sequence acquired by the acquisition unit 13 (that is, re-ranking). For example, in the negative examples illustrated in FIGS. 2(B) and 2(C), if the recognition ranking of the recognition candidate corresponding to the correct answer data is advanced as the final recognition result (the number one recognition candidate), it is possible to improve recognition accuracy. The first model M1 outputs an evaluation value to be used for update of such recognition ranking The first model M1 is an identifier that is learned by, for example, a boosting algorithm such as XGboost. The first model generation unit 14 executes machine learning using first learning data in which feature quantities regarding two recognition candidates obtained by the pattern recognition for the input image are explanatory variables, and an index value indicating whether or not one of the two recognition candidates is correct answer data corresponding to recognition target data is an objective variable to generate the first model M1.

Figure 3:
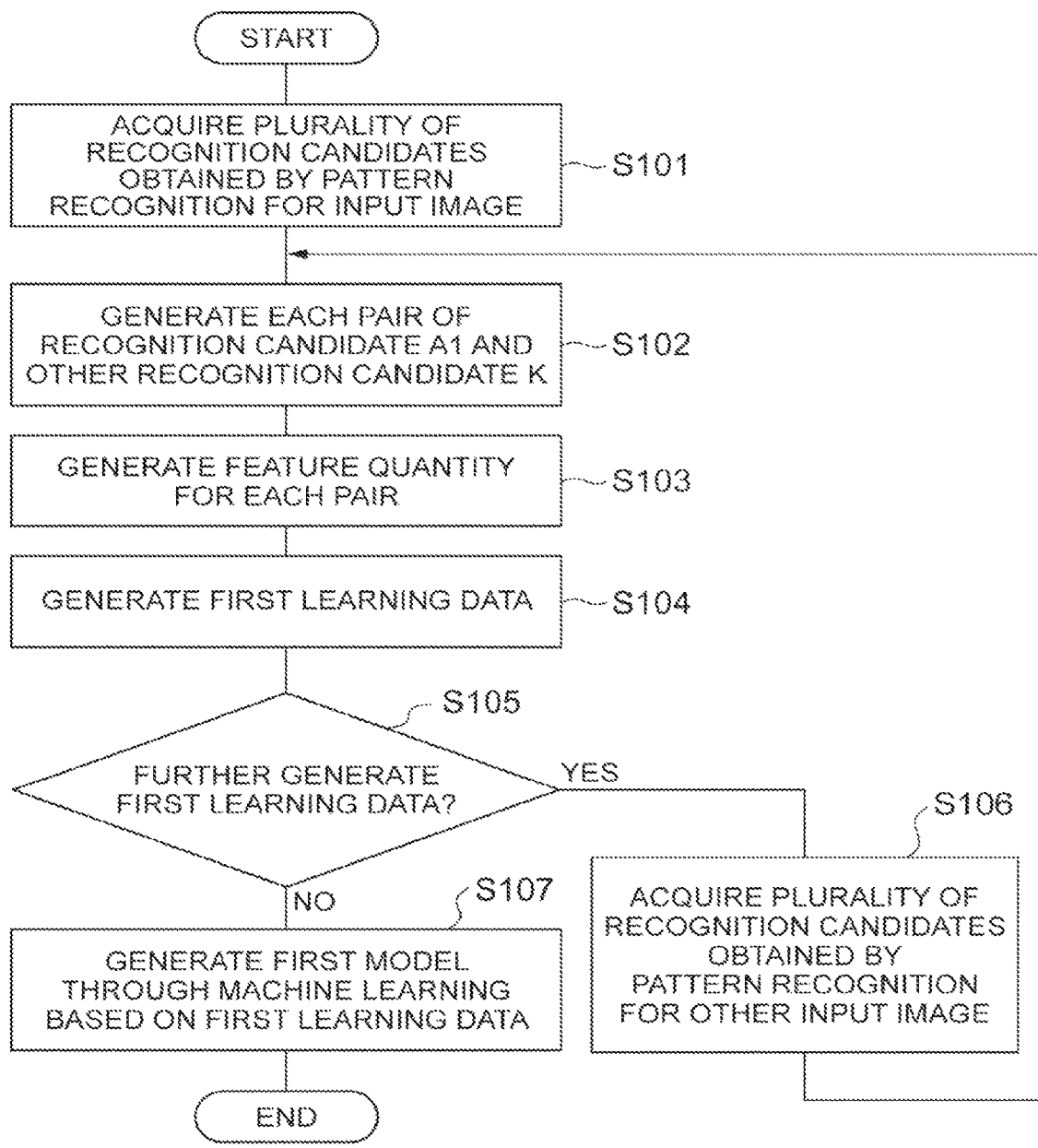
FIG. 3 is a flowchart illustrating an example of a process of a first model generation unit.

An example of a process of the first model generation unit 14 will be described with reference to FIG. 3.

In step S101, the first model generation unit 14 acquires a plurality of (in this case, n+m) recognition candidates obtained by pattern recognition for a certain input image (recognition target data). Specifically, the first model generation unit 14 acquires the recognition candidate sequence (A1, . . . , An, B1, . . . , Bm) by the processes of the first recognition unit 11, the second recognition unit 12, and the acquisition unit 13 being executed for the input image.

Figure 4:
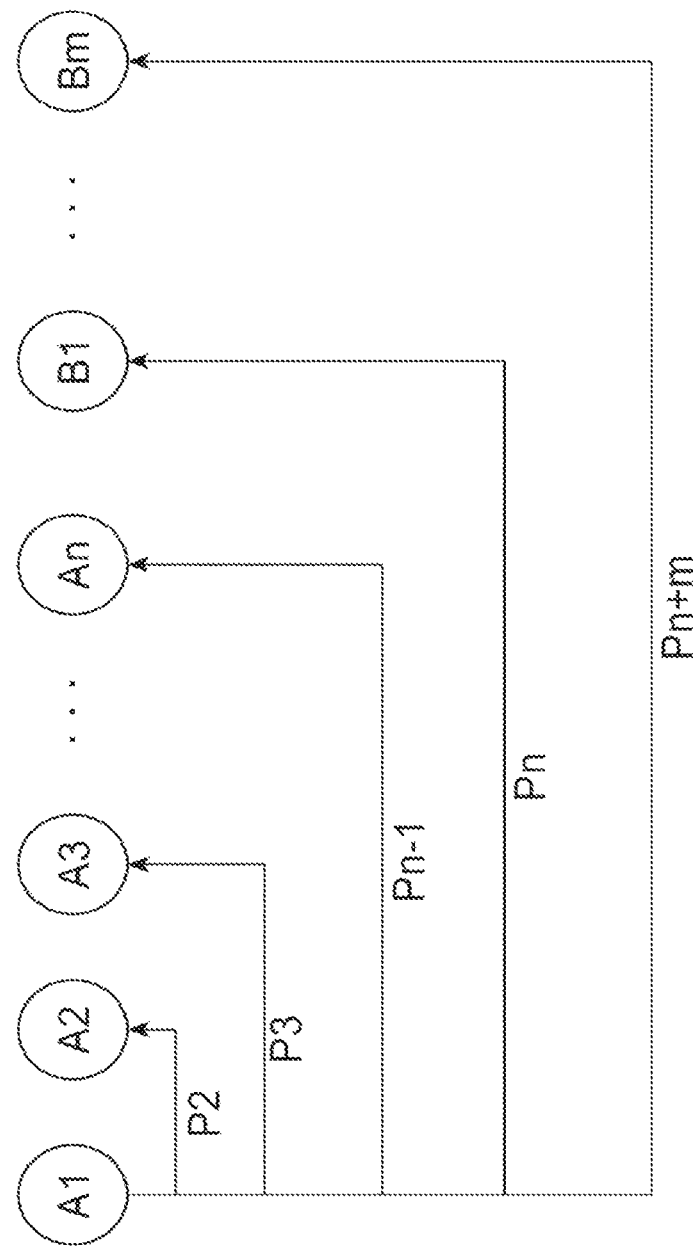
FIG. 4 is a diagram illustrating a pair of recognition candidates that are generated by the first model generation unit.

In step S102, the first model generation unit 14 extracts two recognition candidates from among the plurality of recognition candidates to generate a pair. In the embodiment, as an example, the first model generation unit 14 generates each pair of the recognition candidate A1 having the number one recognition score in the first pattern recognition and the other recognition candidates A2 to An and B1 to Bm. Thereby, n+m−1 pairs from a pair $P_2$ (A1, A2) of the recognition candidate A1 and the recognition candidate A2 to a pair $P_{n+m}$ (A1, Bm) of the recognition candidate A1 and the recognition candidate Bm are generated, as illustrated in FIG. 4.

In step S103, the first model generation unit 14 generates a feature quantity for each pair. In the embodiment, as an example, the first model generation unit 14 generates a 10-dimensional feature quantity including the following elements a1 to a10 as feature quantities of the pair of the recognition candidate A1 and the recognition candidate K (K=A2 to An, B1 to Bm) (feature quantities regarding the recognition candidate A1 and the recognition candidate K). Here, "score_k" is a recognition score of the recognition candidate K. A "degree of similarity" is a cosine distance between feature quantities extracted by a CNN constructed by deep learning. The "degree of degree of similarity_k" is a cosine distance between the feature quantity of the input image and the feature quantity of the recognition candidate K.

<Example of Feature Quantity of Pair of Recognition Candidate A1 and Recognition Candidate K> a1=score_K÷score_A1
a2=(score_A1−score_K)÷score_A1
a3=degree of similarity_A1
a4=degree of similarity_K
a5=degree of similarity_A1−degree of similarity_K
a6=degree of similarity_K÷degree of similarity_A1
a7=score_A1×degree of similarity_A1
a8=score_K×degree of similarity_K
a9=(score_A1×degree of similarity_A1)−(score_K×degree of similarity_K)
a10=(score_K×degree of similarity_K)÷(score_A1×degree of similarity_A1)

In step S104, the first model generation unit 14 generates first learning data in which the feature quantities regarding the two recognition candidates (in this case, the feature quantities of the pair of the recognition candidate A1 and the recognition candidate K) are explanatory variables (inputs), and an index value indicating whether one of the two recognition candidates (recognition candidate K in this case) is the correct answer data corresponding to the input image is an objective variable. In the embodiment, the index value is a flag value that is set to "1" when the recognition candidate K is the correct answer data corresponding to the input image and is set to "0" when the recognition candidate K is not the correct answer data corresponding to the input image. That is, the index value is "1" when the correct recognition result is obtained by the recognition ranking of the recognition candidate K being made number one (in other words, a position of the recognition candidate A1 and a position of the recognition candidate K being changed), and otherwise, "0". In the embodiment, n+m−1 (that is, the number of pairs) pieces of first learning data are generated through the processes of steps S101 to S104 for one input image.

In step S105, the first model generation unit 14 determines whether or not to further generate the first learning data. For example, the first model generation unit 14 executes the same processing as in step S101 for other input image (input image for which the processes of steps S101 to S104 have not been executed) until the first learning data of which the index value is "0" and the first learning data of which index value is "1" are obtained by a number sufficient to ensure the accuracy of the first model M1 (step S105: YES→step S106), and executes the processes of steps S102 to S104 for a result of the execution. Thereby, first learning data for another input image is generated. When a sufficient number of pieces of first learning data is obtained and it is not necessary to further generate the first learning data (step S105: NO), the first model generation unit 14 executes machine learning based on the first learning data to generate the first model M1 (step S107).

Figure 5:
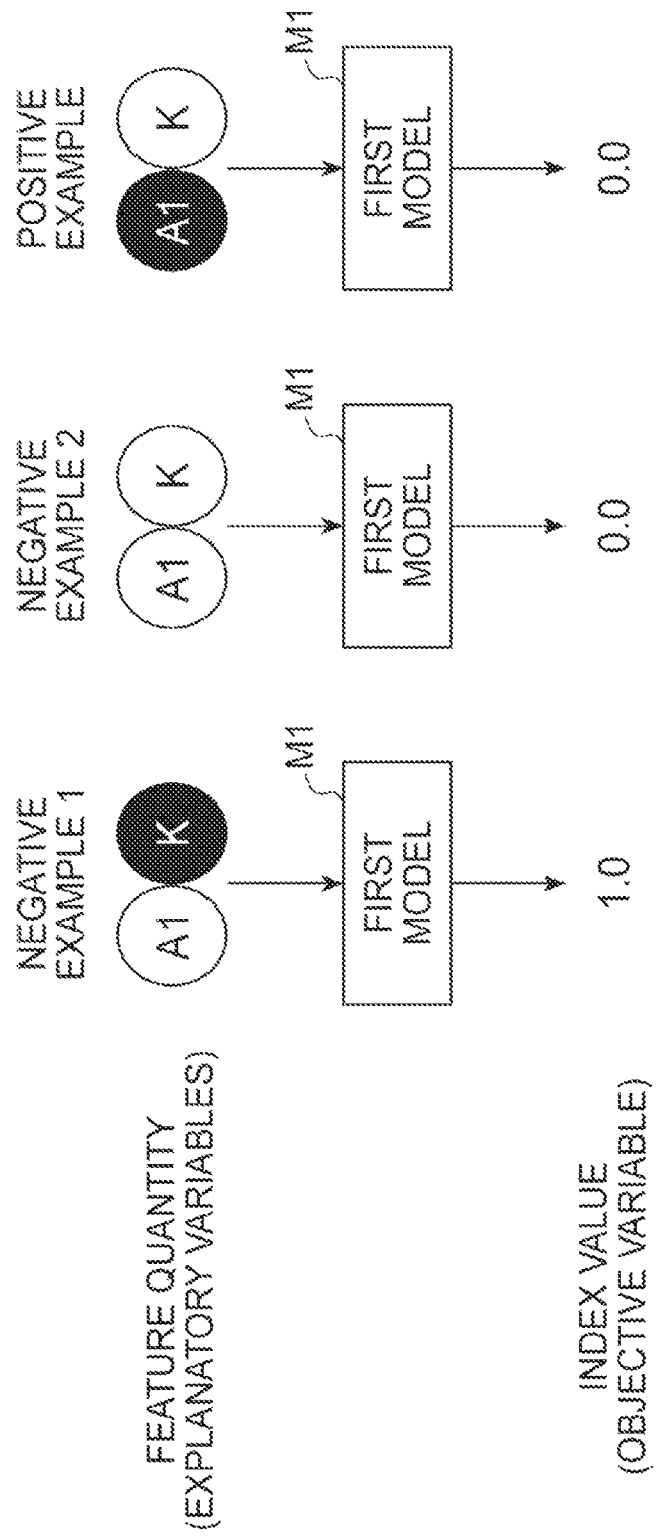
FIG. 5 is a diagram illustrating a generation method (learning method) for the first model.

FIG. 5 is a diagram illustrating a generation method (learning method) of the first model M1. In FIG. 5, black recognition candidates indicate the correct answer data corresponding to the input image. Here, a negative example is an example in which the correct recognition result is not obtained by the first pattern recognition (that is, an example in which the recognition candidate A1 is not the correct answer data corresponding to the input image). On the other hand, a correct example is an example in which the correct recognition result is obtained by the first pattern recognition (that is, an example in which the recognition candidate A1 is the correct answer data corresponding to the input image).

In FIG. 5, "Negative example 1" indicates a pair in which the recognition candidate K is correct answer data corresponding to the input image. The first learning data corresponding to the pair is data in which the feature quantities (a1, . . . , a10) of the pair are explanatory variables, and the index value "1" is an objective variable. "Negative example 2" indicates a pair in which neither the recognition candidate A1 nor the recognition candidate K is the correct answer data corresponding to the input image. The first learning data corresponding to the pair is data in which the feature quantities (a1, . . . , a10) of the pair are explanatory variables, and the index value "0" is the objective variable. The "correct example" indicates a pair in which the recognition candidate A1 is the correct answer data corresponding to the input image. The first learning data corresponding to the pair is data in which the feature quantities (a1, . . . , a10) of the pair are explanatory variables, and the index value "0" is the objective variable.

By using such first learning data, it is possible to cause the first model M1 to be learned so that "1" is output only when the recognition candidate K is correct answer data. That is, the output value of the first model M1 constructed by such machine learning indicates a possibility that the recognition candidate K is the correct answer data of the input image (in other words, a probability of the correct recognition result being obtained by changing the position of the recognition candidate A1 and the position of the recognition candidate K (a change probability)). Therefore, when a recognition process for a certain input image is executed, the feature quantity of each pair of the recognition candidate A1 and the recognition candidate K (K=A2 to An, B1 to Bm) is input to the first model M1, an output value for each recognition candidate K is output, and the plurality of recognition candidates are sorted in descending order of the output values, such that the plurality of recognition candidates can be sorted in descending order of a possibility of being the correct answer data corresponding to the input image.

In the mechanism, the output value of the first model M1 corresponding to the recognition candidate A1 cannot be obtained, but "0.5" may be assigned to the recognition candidate A1 as a value (a reference value) corresponding to the output value of each recognition candidate K. The reason therefor is as follows. The output value of the first model M1 greater than 0.5 indicates that a possibility of the recognition candidate K being the correct answer data corresponding to the input image is higher than that of the recognition candidate A1 (that is, the position of the recognition candidate A1 and the position of the recognition candidate K are to be changed). On the other hand, the output value of the first model M1 smaller than 0.5 indicates that a possibility of the recognition candidate A1 being the correct answer data corresponding to the input image is higher than that of the recognition candidate K (that is, the position of the recognition candidate A1 and the position of the recognition candidate K is not to be changed). That is, in the first model M1 learned as described above, "0.5" is a boundary value for determining whether or not the position of the recognition candidate A1 and the position of the recognition candidate K are to be changed. Accordingly, it is possible to appropriately perform the sorting of the plurality of recognition candidates described above by assigning "0.5" to the recognition candidate A1.

The second model generation unit 15 generates the second model M2 for determining the validity of the result of sorting (re-ranking) based on the output value of the first model M1 described above. The second model M2 is, for example, an identifier to be learned by a boosting algorithm such as XGboost.

Figure 6:
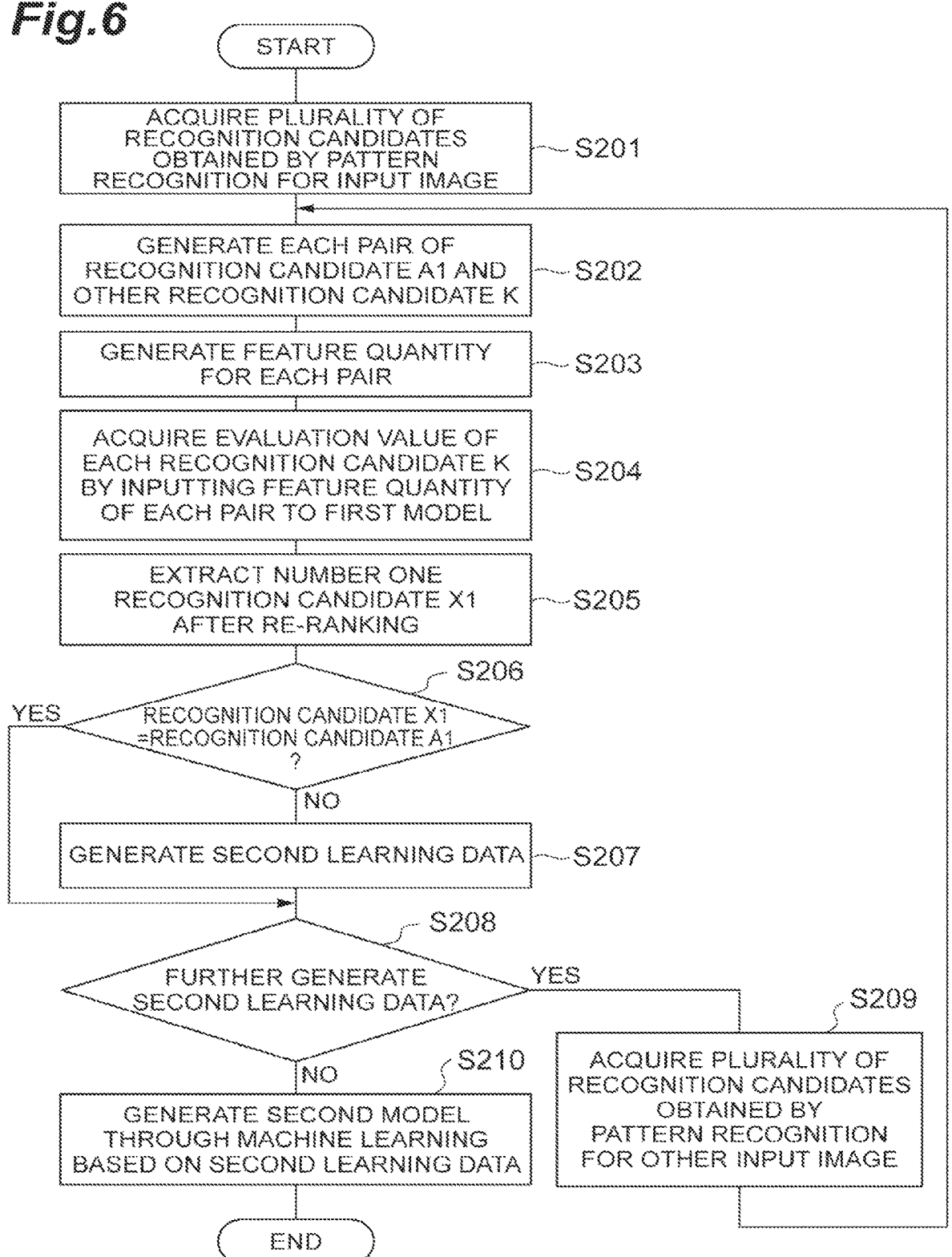
FIG. 6 is a flowchart illustrating an example of a process of a second model generation unit.

An example of a process of the second model generation unit 15 will be described with reference to FIG. 6.

The process of steps S201 and S202 is the same as the process of steps S101 and S102 described above.

That is, in step S201, the second model generation unit 15 acquires a plurality (in this case, n+m) recognition candidates obtained by pattern recognition for a certain input image (recognition target data). In step S202, the second model generation unit 15 extracts two recognition candidates from among the plurality of recognition candidates to generate a pair. Thereby, n+m−1 pairs from a pair $P_2$ (A1, A2) of the recognition candidate A1 and the recognition candidate A2 to a pair $P_{n+m}$ (A1, Bm) of the recognition candidate A1 and the recognition candidate Bm are generated, as illustrated in FIG. 4.

In step S203, the second model generation unit 15 generates the feature quantities (a1, . . . , a10) regarding the recognition candidate A1 and the recognition candidate K serving as one of the recognition candidates with respect to each pair of the recognition candidate A1 (fourth recognition candidate) having the number one recognition score and another recognition candidate K (K=A2 to An, B1 to Bm) (fifth recognition candidate).

In step S204, the second model generation unit 15 acquires, as an evaluation value of each pair (that is, each recognition candidate K), an output value of the first model M1 obtained by inputting the feature quantity (a1, . . . , a10) to the first model M1 for each pair of the recognition candidate A1 and the recognition candidate K (K=A2 to An, B1 to Bm).

In step S205, the second model generation unit 15 extracts a recognition candidate X1 (sixth recognition candidate) that is a candidate for the final recognition result on the basis of an evaluation value of each recognition candidate K. Specifically, the second model generation unit 15 extracts the recognition candidate X1 having a maximum value among the reference value (0.5) assigned to the recognition candidate A1 in advance and the evaluation value of each recognition candidate K (X1 is any one of A1 to An and B1 to Bm). The recognition candidate X1 is a recognition candidate with the number one recognition ranking after re-ranking based on the output value (evaluation value) of the first model M1.

In step S206, the second model generation unit 15 determines whether or not the recognition candidate X1 is the same as the recognition candidate A1. When the recognition candidate X1 is different from the recognition candidate A1 (step S206: NO), the second model generation unit 15 generates second learning data (step S207). On the other hand, when the recognition candidate X1 is the same as the recognition candidate A1 (step S206: YES), there is no change in the number one recognition candidate before and after re-ranking (that is, the recognition candidate A1 remains number one), and the recognition candidate is not a target of evaluation of the validity of re-ranking. Therefore, the second model generation unit 15 skips the process of step S207.

In step S207, the second model generation unit 15 first generates the feature quantity regarding the recognition candidate A1 and the recognition candidate X1. In the embodiment, as an example, the second model generation unit 15 generates a six-dimensional feature quantity including the following elements b1 to b6 as the feature quantity regarding the recognition candidate A1 and the recognition candidate X1.

<Example of Feature Quantity of Pair of Recognition Candidate A1 and Recognition Candidate X1>
b1=score_A1
b2=degree of similarity_A1
b3=score_X1
b4=degree of similarity_X1
b5=Evaluation value of recognition candidate X1 (output value of first model M1)
b6=degree of similarity between recognition candidate A1 (dictionary image) and recognition candidate X1 (dictionary image)

Subsequently, the second model generation unit 15 generates the second learning data in which the feature quantities (b1, . . . , b6) regarding the recognition candidate A1 and the recognition candidate X1 are explanatory variables, and an index value indicating whether or not the recognition candidate X1 is correct answer data is an objective variable. In the embodiment, the index value is a flag value that is set to "1" when the recognition candidate X1 is the correct answer data corresponding to the input image, and is set to "0" when the recognition candidate A1 is the correct answer data corresponding to the input image. That is, the index value becomes "1" when the correct recognition result is obtained by the recognition ranking of the recognition candidate X1 being set to number one (that is, the position of the recognition candidate A1 and the position of the recognition candidate X1 being changed) (that is, when re-ranking based on the output value (evaluation value) of the first model M1 is valid) and, otherwise, becomes "0".

When neither the recognition candidate A1 nor the recognition candidate X1 is the correct answer data corresponding to the input image, the recognition candidates are excluded from a generation target of the second learning data because there is no meaning in determining the validity of the re-ranking. That is, the second model generation unit 15 generates the second learning data corresponding to any one of a case in which the recognition candidate X1 is the correct answer data (a positive example indicating that re-ranking is valid) and a case in which the recognition candidate A1 is the correct answer data (a negative example indicating that re-ranking is not valid).

In step S208, the second model generation unit 15 determines whether or not to further generate the second learning data. For example, the second model generation unit 15 executes the same processing as in step S201 for other input image (input image for which the processes of steps S201 to S207 have not been executed) until the second learning data corresponding to each of the positive example and the negative example is obtained by a number sufficient to ensure the accuracy of the second model M2 (step S208: YES→step S209), and executes the processes of steps S202 to S207 for a result of the execution. This allows the second learning data for another input image to be generated. However, when step S207 is skipped, or when neither the recognition candidate A1 nor the recognition candidate X1 is the correct answer data corresponding to the input image (when the data does not correspond to the positive example and the negative example described above), for example, new second learning data is not obtained. In this case, a process for another input image may be continued until new second learning data is obtained. When a sufficient number of pieces of second learning data is obtained and it is not necessary to further generate the second learning data (step S208: NO), the second model generation unit 15 executes the machine learning based on the second learning data to generate the second model M2 (step S210).

Figure 7:
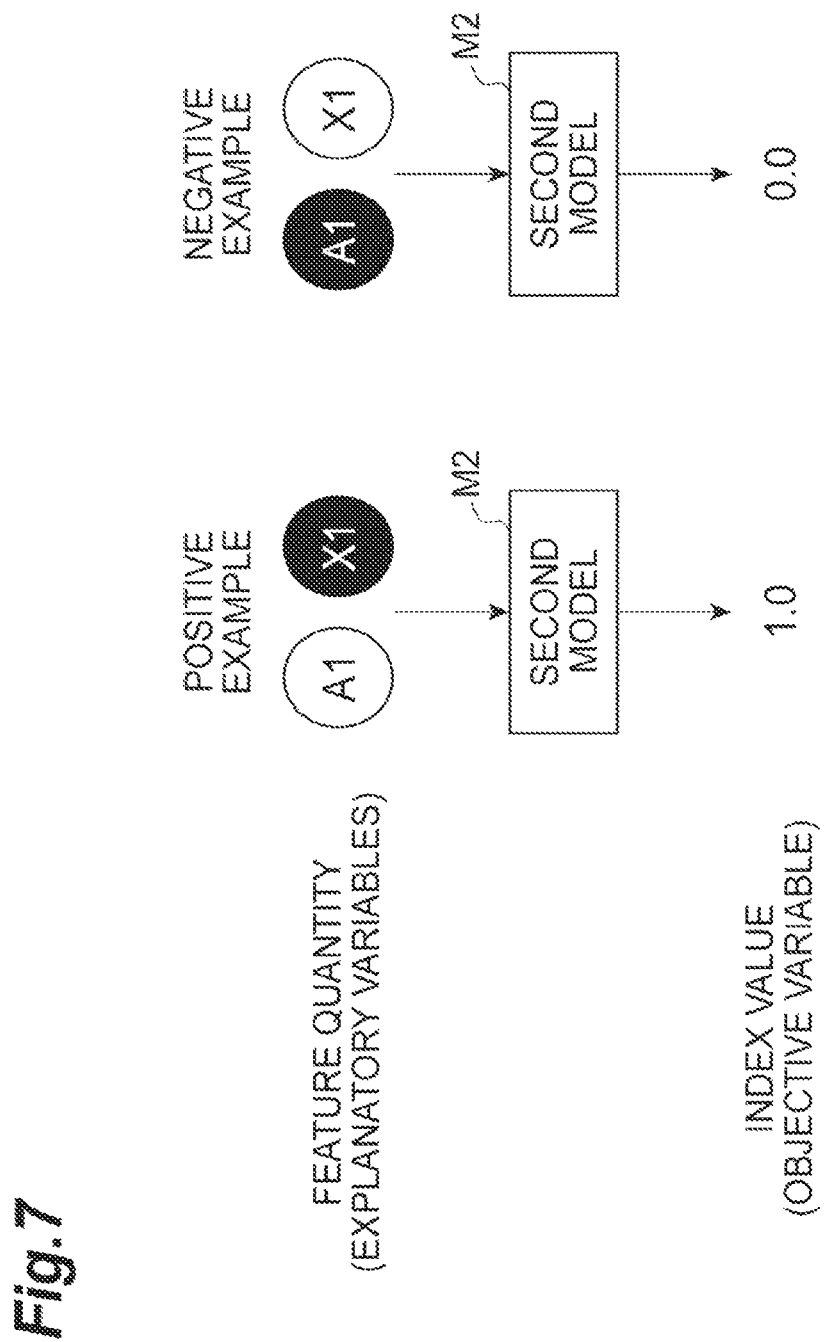
FIG. 7 is a diagram illustrating a generation method (learning method) for a second model.
Figure 8:
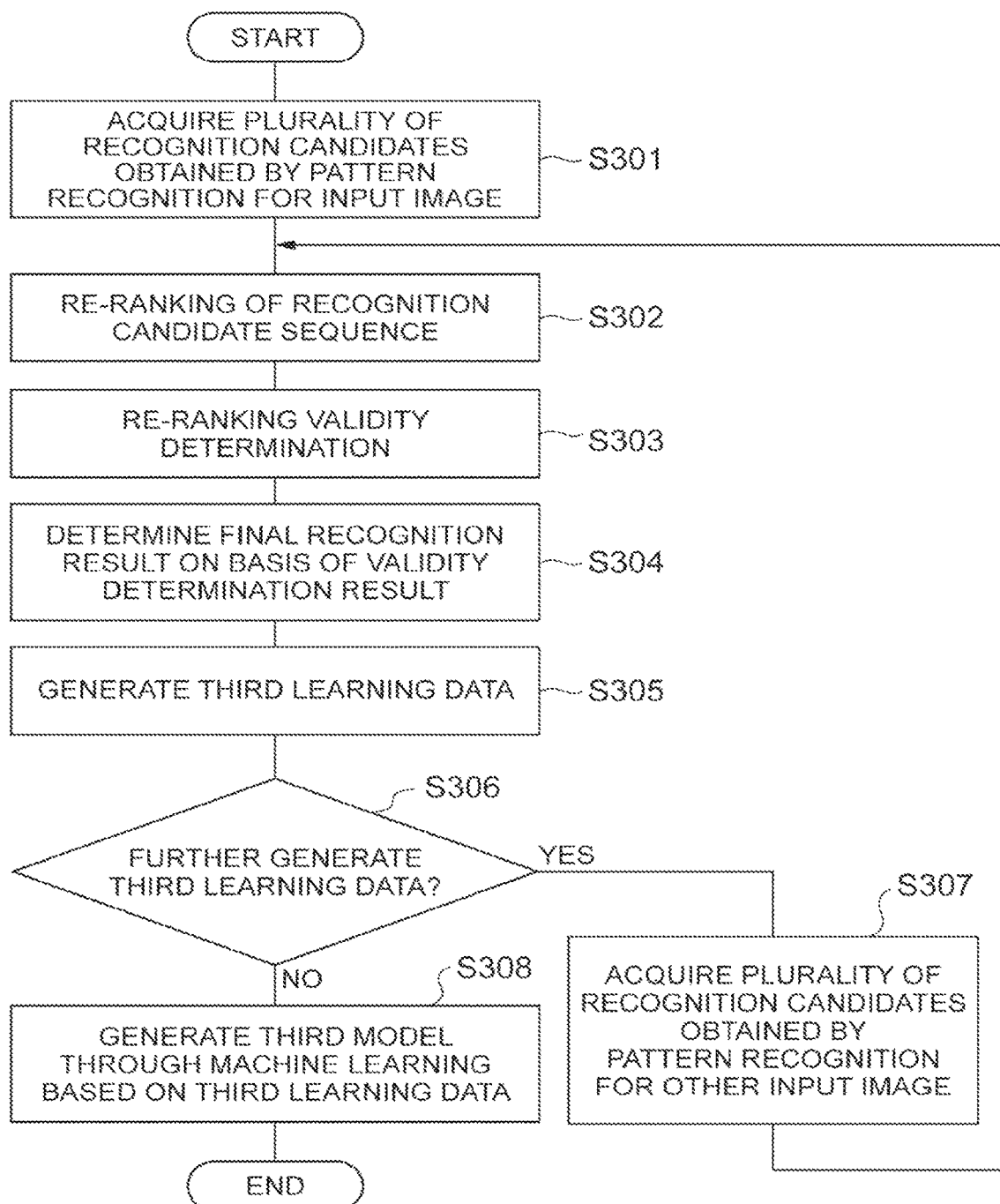
FIG. 8 is a flowchart illustrating an example of a process of a third model generation unit.

FIG. 7 is a diagram illustrating a generation method (learning method) for the second model M2. In FIG. 7, black recognition candidates indicate the correct answer data corresponding to the input image. Here, the positive example is an example in which the correct recognition result is obtained by re-ranking (a process of changing the ranking of the recognition candidate X1 to the number one) based on the output value (evaluation value) of the first model M1. On the other hand, the negative example is an example in which the correct recognition result cannot be obtained by the re-ranking (that is, an example in which the correct recognition result is obtained without performing the re-ranking).

As illustrated in FIG. 7, the second learning data corresponding to the pair corresponding to the positive example is data in which the feature quantities (b1, . . . , b6) of the pair are explanatory variables and the index value "1" is an objective variable. The second learning data corresponding to the pair corresponding to the negative example is data in which the feature quantities (b1, . . . , b6) of the pair are explanatory variables, and the index value "0" is the objective variable.

By using the second learning data, it is possible to cause the second model M2 to be learned so that "1" is output only when re-ranking is valid (that is, when the recognition candidate X1 is correct answer data). That is, the output value of the second model M2 constructed by such machine learning indicates a probability of the correct recognition result being obtained by adopting a result after re-ranking (that is, a probability of re-ranking being valid). Therefore, when a recognition process for a certain input image is executed, it is possible to output an appropriate recognition result taking the validity of the re-ranking into account on the basis of the output value of the second model M2. For example, when the output value of the second model M2 is greater than 0.5 (or is equal to or greater than 0.5), the number one recognition candidate X1 after re-ranking can be set as the final recognition result, and when the output value of the second model M2 is equal to or smaller than 0.5 (or is smaller than 0.5), the number one recognition candidate A1 before re-ranking can be set as the final recognition result.

The third model generation unit 16 generates the third model M3 for outputting a degree of certainty (a degree of correctness) of the final recognition result determined on the basis of the re-ranking based on the first model M1 and the validity determination of the re-ranking based on the second model M2. The third model M3 is, for example, an identifier that is learned by a boosting algorithm such as XGboost.

An example of a process of the third model generation unit 16 will be described with reference to FIG. 3.

The process of step S301 is the same as the process of step S101 described above. That is, in step S301, the third model generation unit 16 acquires a plurality of (in this case, n+m) recognition candidates obtained by pattern recognition for a certain input image (recognition target data). Specifically, recognition candidate sequence (A1, . . . , An, B1, . . . , Bm) as illustrated in FIG. 2 are obtained as recognition candidate sequence before re-ranking.

In step S302, the third model generation unit 16 executes the same processing as in steps S202 to S205 described above to perform re-ranking of the plurality of recognition candidates. That is, the third model generation unit 16 sorts the reference value (0.5) of the recognition candidate A1 and the evaluation value (output value of the first model M1) of each recognition candidate K (K=A2 to An, B1 to Bm) in descending order to sort a plurality of recognition candidates. Thereby, a recognition candidate sequence (X1, . . . , Xn+m−1) after re-ranking is obtained.

In step S303, the third model generation unit 16 determines the validity of the re-ranking using the second model M2. Specifically, when the number one recognition candidate X1 after the re-ranking is different from the recognition candidate A1, the third model generation unit 16 acquires, as a second evaluation value, an output value obtained by inputting the feature quantities (b1, . . . , b6) regarding the recognition candidate A1 and the recognition candidate X1 to the second model M2.

In step S304, the third model generation unit 16 determines the final recognition result on the basis of the second evaluation value obtained in step S303. In the embodiment, when the second evaluation value is equal to or greater than 0.5, the third model generation unit 16 adopts the recognition candidate sequence (X1, . . . , Xn+m−1) after re-ranking, and sets the number one recognition candidate X1 after re-ranking as the final recognition result. On the other hand, when the second evaluation value is smaller than 0.5, the third model generation unit 16 adopts the recognition candidate sequence (A1, . . . , An, B1, . . . , Bm) before re-ranking, and sets the number one recognition candidate A1 before re-ranking as the final recognition result.

In step S305, the third model generation unit 16 generates third learning data on the basis of the recognition candidate sequence adopted in step S304. Hereinafter, the recognition candidate sequence adopted in step S304 is represented as (Y1, . . . , Yn+m−1). The recognition candidate sequence (Y1, . . . , Yn+m−1) is the recognition candidate sequence (A1, . . . , An, B1, . . . , Bm) before re-ranking or the recognition candidate sequence (X1, . . . , Xn+m−1) after re-ranking.

First, the third model generation unit 16 generates the feature quantities of the number one recognition candidate Y1 and the number two recognition candidate Y2 of the recognition candidate sequence (Y1, . . . , Yn+m−1) adopted in step S304. In the embodiment, as an example, the third model generation unit 16 generates an 11-dimensional feature quantity including the following elements $c_1$ to $c_{11}$ as the feature quantity regarding the recognition candidate Y1 and the recognition candidate Y2.

<Example of Feature Quantity of Pair of Recognition Candidate Y1 and Recognition Candidate Y2>

$c_1$=score_Y1
$c_2$=Degree of similarity_Y1
$c_3$=Evaluation value of recognition candidate Y1 (output value of first model M1 or reference value)
$c_4$=score_Y2
$c_5$=Degree of similarity_Y2
$c_6$=Evaluation value of recognition candidate Y2 (output value of first model M1 or reference value)
$c_7$=score_Y1−score_Y2
$c_8$=score_Y2÷score_Y1
$c_9$=Degree of similarity_Y2÷degree of similarity_Y1
$c_{10}$=Evaluation value of recognition candidate Y1÷evaluation value of recognition candidate Y2
$c_{11}$=Degree of similarity between the recognition candidate Y1 (dictionary image) and the recognition candidate Y2 (dictionary image)

Subsequently, the third model generation unit 16 generates third learning data in which the feature quantities ($c_1$, . . . , $c_{11}$) regarding the recognition candidate Y1 and the recognition candidate Y2 are explanatory variables and an index value indicating whether or not the recognition candidate Y1 is correct answer data is an objective variable. In the embodiment, the index value is a flag value that is set to "1" when the recognition candidate Y1 is the correct answer data corresponding to the input image, and is set to "0" when the recognition candidate Y1 is not the correct answer data corresponding to the input image.

In step S306, the third model generation unit 16 determines whether or not to further generate the third learning data. For example, the third model generation unit 16 executes the same processing as in step S301 for other input image (input image for which the processes of steps S301 to S305 have not been executed) until the third learning data corresponding to each of the positive example (a case in which the index value is 1) and the negative example (a case in which the index value is 0) is obtained by a number sufficient to ensure the accuracy of the third model M3 (step S306: YES→step S307), and executes the processes of steps S302 to S305 for a result of the execution. Thereby, the third learning data for another input image is generated. When a sufficient number of pieces of third learning data is obtained and it is not necessary to further generate the third learning data (step S306: NO), the third model generation unit 16 executes the machine learning based on the third learning data to generate the third model M3 (step S308).

Through the above process, it is possible to cause the third model M3 to be learned so that "1" is output only when the correct recognition result is finally obtained. That is, the output value of the third model M3 constructed by such machine learning indicates a possibility of the final recognition result (recognition candidate Y1) being the correct answer data corresponding to the input image (that is, a degree of certainty of the final recognition result).

Next, a functional element (the calculation unit 17, the determination unit 18, and the output unit 19) for executing a recognition process for an input image input as a recognition target using the learned models (the first model M1, the second model M2, and the third model M3) obtained as described above will be described.

The calculation unit 17 calculates an evaluation value obtained by quantifying the possibility of the recognition candidate K being the correct answer data corresponding to the input image on the basis of the feature quantities regarding the recognition candidate A1 and the recognition candidate K for each pair of the recognition candidate A1 (first recognition candidate) having the number one recognition score and the other recognition candidates K (K=A2 to An, B1 to Bm) (second recognition candidate) among the plurality of recognition candidates. Specifically, the calculation unit 17 acquires, as an evaluation value, an output value obtained by inputting the feature quantity (a1, ..., a10) regarding the recognition candidate A1 and the recognition candidate K serving as one of the recognition candidates to the first model M1, for each pair (the recognition candidate A1 and the recognition candidate K). Thereby, the evaluation value of each recognition candidate K is obtained.

The determination unit 18 determines the final recognition result from among the plurality of recognition candidates on the basis of the evaluation value of each recognition candidate K calculated by the calculation unit 17. In the embodiment, the determination unit 18 first extracts the recognition candidate X1 that is the candidate for the final recognition result (third recognition candidate) on the basis of a comparison result of the reference value (0.5) assigned to the recognition candidate A1 in advance and the evaluation value of each recognition candidate K. For example, the determination unit 18 sorts the reference value (0.5) of the recognition candidate A1 and the evaluation value of each recognition candidate K in descending order to sort the plurality of recognition candidates. That is, a recognition ranking of the plurality of recognition candidates is updated (re-ranked) on the basis of the reference value or the evaluation value. Thereby, the number one recognition candidate X1 after re-ranking is obtained as the candidate for the final recognition result together with the recognition candidate sequence (X1, ..., Xn+m−1) after re-ranking.

Subsequently, when the recognition candidate X1 is different from the recognition candidate A1, the determination unit 18 calculates a second evaluation value obtained by quantifying validity of the recognition candidate X1 being the final recognition result on the basis of the feature quantities regarding the recognition candidate A1 and the recognition candidate X1. Specifically, when the recognition candidate X1 is different from the recognition candidate A1, the determination unit 18 generates feature quantities (b1, ..., b6) regarding the recognition candidate A1 and the recognition candidate X1. The determination unit 18 acquires, as the second evaluation value, an output value obtained by inputting the feature quantity (b1, ..., b6) to the second model M2.

Then, the determination unit 18 determines whether or not the recognition candidate X1 is to be set as the final recognition result on the basis of the second evaluation value. For example, the determination unit 18 determines which of the number one recognition candidate A1 before re-ranking and the number one recognition candidate X1 after re-ranking is the final recognition result on the basis of a comparison result between the second evaluation value and a preset threshold value (0.5 in this embodiment). For example, when the second evaluation value is equal to or greater than 0.5, the determination unit 18 may adopt the recognition candidate sequence (X1, ..., Xn+m−1) after re-ranking, and set the number one candidate X1 after re-ranking as the final recognition result. On the other hand, when the second evaluation value is smaller than 0.5, the determination unit 18 may adopt the recognition candidate sequence (A1, ..., An, B1, ..., Bm) before re-ranking, and set the number one recognition candidate A1 before re-ranking as the final recognition result.

According to the process of the determination unit 18 as described above, it is possible to determine the recognition candidates having a high possibility of being correct answer data corresponding to the input image on the basis of respective results of the re-ranking using the first model M1 and the validity determination of the re-ranking using the second model M2.

The output unit 19 outputs the final recognition candidate sequence (Y1, ..., Yn+m−1) determined by the determination unit 18 to a display, a printer, another external device, or the like. In the embodiment, the output unit 19 generates feature quantities (c1, ..., c11) regarding the number one recognition candidate Y1 and the number two recognition candidate Y2 in the final recognition candidate sequence (Y1, ..., Yn+m−1). The output unit 19 acquires an output value obtained by inputting the feature quantity (c1, ..., c11) to the third model M3 as the degree of certainty of the final recognition result. For example, the output unit 19 can output the final recognition result (recognition candidate Y1) and the degree of certainty to a display or the like to present the final recognition result and the degree of certainty to the user. The output unit 19 may output not only the final recognition result (recognition candidate Y1), but also some (for example, upper x) or all in the final recognition candidate sequence (Y1, ..., Yn+m−1). In this case, it is possible to improve convenience for the user by presenting a plurality of recognition results to the user in descending order of the possibility of being the correct answer data.

Figure 9:
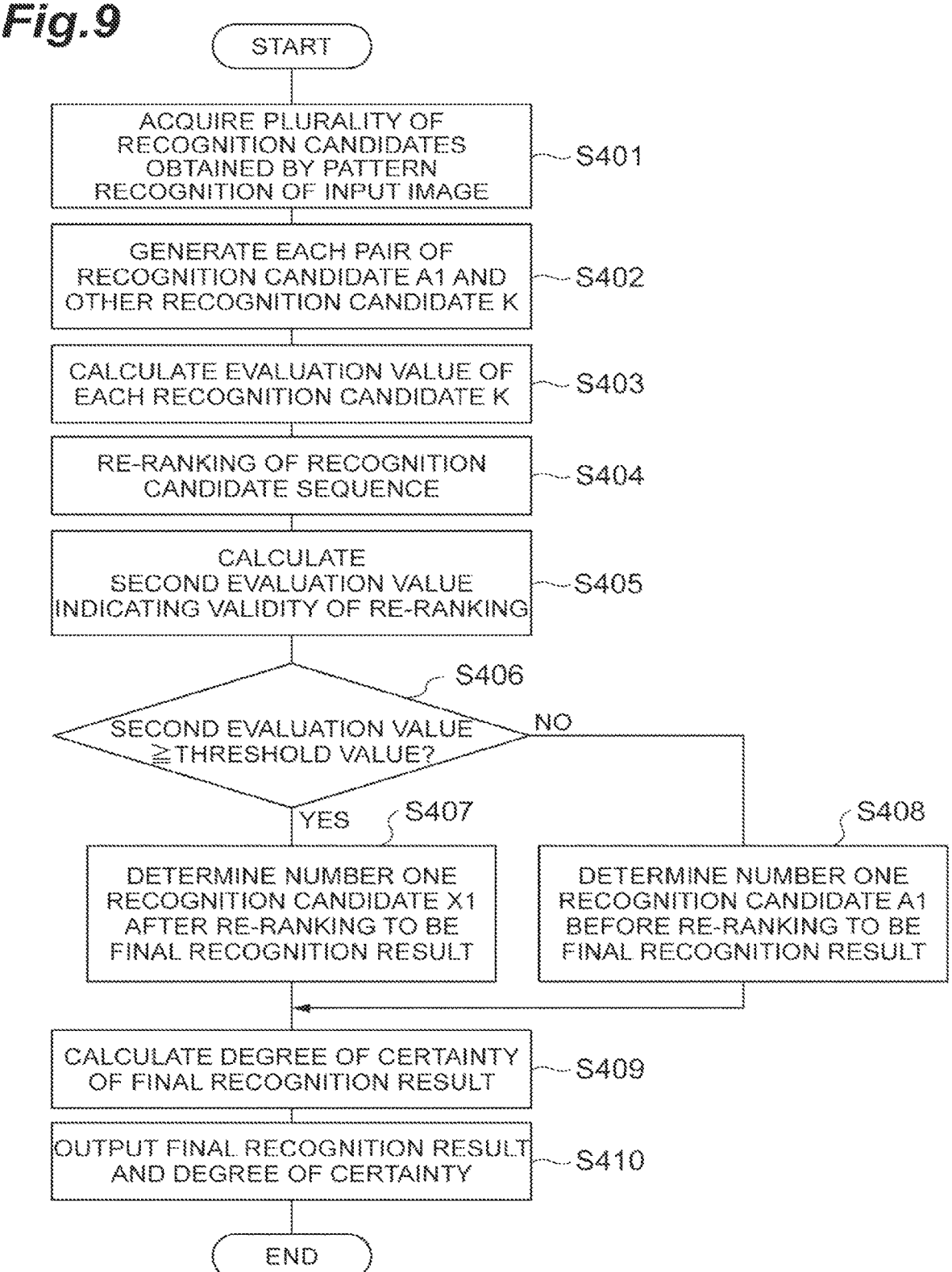
FIG. 9 is a flowchart illustrating an example of a recognition process of the pattern recognition device.

Next, an example of a processing procedure (a pattern recognition method according to an embodiment) of the pattern recognition device when the recognition process is executed will be described with reference to FIG. 9.

In step S401, the acquisition unit 13 acquires a plurality of (in this case, n+m) recognition candidates obtained by pattern recognition of an input image (recognition target data). In the embodiment, the acquisition unit 13 acquires the n recognition candidates A1 to An obtained by the first recognition unit 11 (the first pattern recognition) and in recognition candidates B1 to Bm not overlapping the recognition candidates A1 to An obtained by the second recognition unit 12 (the second pattern recognition), as the plurality of recognition candidates. Thereby, the recognition candidate sequence (A1, . . . , An, B1, . . . , Bm) before re-ranking is obtained, as illustrated in FIG. 2.

In step S402, the calculation unit 17 generates each pair of the number one recognition candidate A1 before re-ranking and other recognition candidates K (K=A2 to An, B1 to Bm) (n+m−1 pair illustrated in FIG. 4).

In step S403, the calculation unit 17 generates the feature quantity (a1, . . . , a10) of each pair. The calculation unit 17 acquires an output value of the first model M1 obtained by inputting the feature quantity (a1, . . . , a10) of each pair to the first model M1, as an evaluation value of each pair (that is, each recognition candidate K).

In step S404, the determination unit 18 sorts the reference value (0.5) assigned to the recognition candidate A1 in advance and the evaluation value of each recognition candidate K (K=A2 to An, B1 to Bm) in descending order to sort the plurality of recognition candidates. That is, the determination unit 18 updates (re-ranks) the recognition ranking of the plurality of recognition candidates. Thereby, a recognition candidate sequence (X1, . . . , Xn+m−1) after the re-ranking is obtained.

In step S405, the determination unit 18 determines the validity of the re-ranking using the second model M2. Specifically, when the number one recognition candidate X1 after the re-ranking is different from the recognition candidate A1, the determination unit 18 acquires, as a second evaluation value, an output value obtained by inputting the feature quantities (b1, . . . , b6) regarding the recognition candidate A1 and the recognition candidate X1 to the second model M2. When the recognition candidate X1 is equal to the recognition candidate A1 (that is, when the number one recognition candidate has not changed due to the re-ranking), the determination unit 18 may skip the processes of steps S405 and S406 and proceed to step S408 to be described below.

In step S406, the determination unit 18 compares the second evaluation value with a preset threshold value (in this case, 0.5). When the second evaluation value is equal to or greater than the threshold value (0.5) (step S406: YES), the determination unit 18 adopts the recognition candidate sequence (X1, . . . , Xn+m−1) after the re-ranking, and sets the number one recognition candidate X1 after re-ranking as the final recognition result (step S407). On the other hand, when the second evaluation value is smaller than the threshold value (0.5) (step S406: NO), the determination unit 18 adopts the recognition candidate sequence (A1, . . . , An, B1, . . . , Bm) before re-ranking, and sets the number one recognition candidate A1 before the re-ranking as the final recognition result (step S408).

In step S409, the output unit 19 generates feature quantities (c1, . . . , c11) regarding the number one recognition candidate Y1 and the number two recognition candidate Y2 in the final recognition candidate sequence. The output unit 19 acquires an output value obtained by inputting the feature quantity (c1, . . . , c11) to the third model M3 as the degree of certainty of the final recognition result.

In step S410, the output unit 19 outputs the final recognition result (recognition candidate Y1) and the degree of certainty. Thereby, it is possible to present the final recognition result and the degree of certainty to the user, or output the final recognition result to an external device or the like that performs some information processing on the basis of the final recognition result.

In the pattern recognition device 10 described above, an evaluation value obtained by quantifying a possibility of the recognition candidate K being the correct answer data is calculated for each pair of the recognition candidate A1 and each recognition candidate K (K=A2 to An, B1 to Bm). That is, the evaluation value of each recognition candidate K is calculated as an index indicating whether or not a possibility of the recognition candidate K being the correct answer data is higher than that of the recognition candidate A1 (in other words, whether or not it is better to change the position of the recognition candidate A1 and the position of the recognition candidate K). The final recognition result is determined from among the plurality of recognition candidates on the basis of the evaluation value of each recognition candidate K. With this configuration, the ranking of the plurality of recognition candidates are appropriately corrected on the basis of the evaluation value of each recognition candidate K instead of the ranking based on the recognition score (that is, the recognition ranking before re-ranking) being determined as it is as a final ranking of the plurality of recognition candidates, and then, the final recognition result can be determined. Therefore, with the pattern recognition device 10, it is possible to achieve improvement of the recognition accuracy.

Further, the pattern recognition executed to obtain the plurality of recognition candidates includes the first pattern recognition (the first recognition unit 11) and the second pattern recognition (the second recognition unit 12) different from the first pattern recognition. The plurality of recognition candidates acquired by the acquisition unit 13 include a recognition candidate (recognition candidate sequence R1) obtained by the first pattern recognition for the input image and a recognition candidate (recognition candidate sequence R2) obtained by the second pattern recognition for the input image. Thus, it is possible to increase a possibility of the correct recognition result being finally obtained, by executing the process (re-ranking) based on the evaluation value described above for the plurality of recognition candidates in which recognition candidates obtained using a plurality of different recognition schemes are all present. For example, when the correct answer data corresponding to the input image is not included in the recognition candidate sequence R1 obtained by the first pattern recognition and the correct answer data is included in the recognition candidate sequence R2 (complementing candidate) obtained by the second pattern recognition, the recognition candidate corresponding to the correct answer data can be obtained as the final recognition result.

Further, the first pattern recognition is a process of recognizing an object included in an input image (image data) on the basis of a feature quantity extracted from the grayscale image obtained by performing grayscale conversion on the input image (in the embodiment, the specific object recognition described above). The second pattern recognition is a process of recognizing the object included in the input image on the basis of a feature quantity including color information of the input image (in the embodiment, object recognition using a neural network such as the CNN described above (similar image search)). As described above, the first pattern recognition has an advantage that object recognition can be easily executed only by preparing a relatively small number of dictionary images, but has a disadvantage that it is difficult to accurately recognize products having the same design in different colors. The second pattern recognition has a disadvantage that it is necessary to construct a neural network using a large number of learning images, but has an advantage of compensation for the disadvantage of the first pattern recognition in that the products having the same design in different colors can be relatively accurately recognized by using color information as a feature quantity. Thus, it is possible to effectively increase the possibility of the correct recognition result being finally obtained, by acquiring the plurality of recognition candidates using a plurality of pattern recognition schemes having a relationship in which the disadvantage of one of the pattern recognitions is compensated for by the other and performing a process (re-ranking) based on the evaluation value of each recognition candidate. That is, even when the recognition candidate corresponding to the correct answer data cannot be obtained using one of the recognition schemes, the recognition candidate corresponding to the correct answer data can be expected to be obtained using the other of the recognition schemes. Further, the recognition candidate corresponding to the correct answer data can be expected to be obtained as the final recognition result by re-ranking.

Further, the determination unit 18 extracts the recognition candidate X1 (third recognition candidate) that is a candidate for the final recognition result on the basis of the evaluation value of each recognition candidate K calculated by the calculation unit 17. In the embodiment, the determination unit 18 acquires the recognition candidate sequence (X1, . . . , Xn+m−1) after re-ranking. When the recognition candidate X1 is different from the recognition candidate A1 (that is, when the number one recognition candidate changes due to the re-ranking), the determination unit 18 calculates a second evaluation value obtained by quantifying the validity of the recognition candidate X1 being set as the final recognition result, on the basis of the feature quantity (b1, . . . , b6) regarding the recognition candidate A1 and the recognition candidate X. The determination unit 18 determines whether or not the recognition candidate X1 is to be set as the final recognition result on the basis of the second evaluation value. In the embodiment, when the second evaluation value is equal to or greater than the threshold value (0.5), the determination unit 18 adopts the recognition candidate sequence after the re-ranking, and sets the recognition candidate X1 as the final recognition result. Thus, it is possible to increase the possibility of the correct recognition result being finally obtained, by determining whether or not to adopt a re-ranking result on the basis of a determination result of the validity of the re-ranking.

In the above embodiment, the calculation unit 17 acquires, as an evaluation value, an output value obtained by inputting the feature quantities (a1, . . . , a10) regarding the recognition candidate A1 and the recognition candidate K to the first model M1 for each pair of the recognition candidate A1 and the recognition candidate K. With this configuration, it is possible to appropriately calculate the evaluation value of each recognition candidate K by using the first model M1 learned so that "1" is output only in a case in which the recognition candidate K is correct answer data (to output "0" in other cases).

Further, in the above embodiment, when the recognition candidate X1 is different from the recognition candidate A1, the determination unit 18 acquires, as the second evaluation value, an output value obtained by inputting the feature quantities (b1, . . . , b6) regarding the recognition candidate A1 and the recognition candidate X1 to the second model M2. With this configuration, it is possible to appropriately calculate the second evaluation value indicating the validity of the re-ranking result by using the second model M2 learned so that "1" is output only when the recognition candidate X1 is the correct answer data (otherwise, "0" is output).

Further, the first model M1 is a learned model for causing a computer to function to input the feature quantities (a1, . . . , a10) regarding the recognition candidate A1 and the recognition candidate K selected from among the plurality of recognition candidates obtained by pattern recognition for the input image and to output an evaluation value obtained by quantifying a possibility of the recognition candidate K, which is one of the recognition candidates, being the correct answer data of the input image. That is, the first model M1 is a combination of a program for performing computation from the input of the feature quantities (a1, . . . , a10) to the output of the evaluation value, and a weighting coefficient (parameter) to be used in the computation. With such a first model M1, an evaluation value for appropriately correcting (re-ranking) the ranking (ranking based on the recognition score) of the plurality of recognition candidates obtained by the pattern recognition for the input image is obtained. Therefore, with the first model M1, it is possible to achieve improvement of the recognition accuracy.

In order to confirm effects of the pattern recognition device 10, the inventors have prepared ten dictionary images for each product in the first pattern recognition and the second pattern recognition described above, and have constructed a neural network (CNN) for use in the second pattern recognition using about 20 learning images for each product. The recognition process has been executed for 155 beverage items and 689 hair care products using the first pattern recognition (the first recognition unit 11) and the second pattern recognition (the second recognition unit 12).

For the 155 beverage items, a correct answer rate when only specific object recognition (the first pattern recognition) has been performed (that is, a rate at which the number one recognition candidate A1 in the first pattern recognition is correct answer data) has been 80%, whereas the correct answer rate of the final recognition result obtained by executing the recognition process has been 83%. That is, 3% improvement in accuracy has been obtained through the above recognition process. For the 689 hair care products, a correct answer rate when only specific object recognition (the first pattern recognition) has been performed has been 78%, whereas the correct answer rate of the final recognition result obtained by executing the recognition process has been 87%. That is, 9% improvement in accuracy has been obtained through the above recognition process. It is considered that such accuracy improvement is because it is possible to achieve improvement of the recognition accuracy of a product of the same design in a different color, which is difficult in the specific object recognition, by performing the above-described re-ranking in combination with similar image search (the second pattern recognition) based on deep learning capable of using the color information as the feature quantity, in addition to the specific object recognition (the first pattern recognition). Further, it is confirmed that it is possible to achieve improvement of the recognition accuracy as compared with a case in which only specific object recognition is performed, while reducing the number of learning images of the CNN used for the second pattern recognition to the number (20 for each product) smaller than the number (several hundreds for each product) considered to be necessary to secure the same recognition accuracy as that of the first pattern recognition through only the second pattern recognition.

MODIFICATION EXAMPLE

The plurality of recognition candidates acquired by the acquisition unit 13 may be candidates obtained using one pattern recognition scheme. Even in this case, improvement of recognition accuracy can be expected by re-ranking based on the evaluation value. Further, the plurality of recognition candidates acquired by the acquisition unit 13 may include candidates obtained using three or more different pattern recognition schemes.

Although the recognition candidates B1 to Bm (recognition candidates not overlapping the recognition candidates A1 to An) obtained by the second pattern recognition are acquired, as complementing candidates for the recognition candidates A1 to An obtained by the first pattern recognition, by the acquisition unit 13 in the above embodiment, the recognition candidates obtained by the first pattern recognition may be acquired as the complementing candidate of the recognition candidates obtained by the second pattern recognition.

Although the recognition candidate A1 having the number one recognition score in the first pattern recognition is set as the recognition candidate serving as a reference of the pair in the above embodiment, the recognition candidate B1 having the number one recognition score in the second pattern recognition may be set as the recognition candidate serving as the reference of the pair. That is, when the plurality of recognition candidates include candidates obtained using a plurality of different pattern recognition schemes, the recognition candidate having the number one recognition score in any one of the pattern recognition schemes may be set as the recognition candidate serving as the reference of the pair.

Although the determination unit 18 has determined that the number one recognition candidate A1 in the first pattern recognition before re-ranking is the final recognition result when the determination unit 18 has determined that the re-ranking is not valid (see step S408 in FIG. 9) in the above embodiment, recognition candidates (for example, the number one recognition candidate in the second pattern recognition) other than the recognition candidate A1 may be determined to be the final recognition result.

The re-ranking validity determination based on the output value (second evaluation value) of the second model M2 may be omitted. In this case, the determination unit 18 may adopt the recognition candidate sequence (X1, ..., Xn+m−1) after re-ranking and sets the number one recognition candidate X1 after re-ranking as the final recognition result. Even in this case, improvement of recognition accuracy can be expected by re-ranking based on the evaluation value. Further, in this case, the second model generation unit 15 may be omitted.

The calculation of the degree of certainty using the third model M3 in the output unit 19 may be omitted. In this case, the third model generation unit 16 may be omitted.

The first recognition unit 11 and the second recognition unit 12 may be provided in an external device different from the pattern recognition device 10. That is, the pattern recognition device 10 may acquire results of the first pattern recognition and the second pattern recognition executed in the external device, and may not execute the first pattern recognition and the second pattern recognition by itself.

The feature quantity input to the first model M1 may include a feature regarding the recognition candidate A1 and the recognition candidate K, and elements and the number of dimensions of the feature quantity are not limited to the above example (a1, ..., a10). The feature quantity input to the second model M2 may include a feature regarding the recognition candidate A1 and the recognition candidate X1, and elements and the number of dimensions of the feature quantity are not limited to the above example (b1, ..., b6). The feature quantity input to the third model M3 may include a feature regarding the final recognition result (recognition candidate Y1), and the elements and the number of dimensions of the feature quantity are not limited to the above example (c1, ..., c11).

Further, although the form applied to the pattern recognition for the image data has been described in the above embodiment, data that is a pattern recognition target is not limited to an image, and may be data other than an image, such as a voice. Further, the pattern recognition may be a recognition process according to the data that is a pattern recognition target, and is not limited to the image recognition described in the above embodiment. For example, the pattern recognition may be a recognition process other than image recognition such as character recognition and voice recognition.

The block diagrams used in the description of the embodiment show blocks in units of functions. These functional blocks (components) are realized in any combination of at least one of hardware and software. Further, a method of realizing each functional block is not particularly limited. That is, each functional block may be realized using one physically or logically coupled device, or may be realized by connecting two or more physically or logically separated devices directly or indirectly (for example, using a wired scheme, a wireless scheme, or the like) and using such a plurality of devices. The functional block may be realized by combining the one device or the plurality of devices with software.

The functions include judging, deciding, determining, calculating, computing, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, or the like, but not limited thereto.

Figure 10:
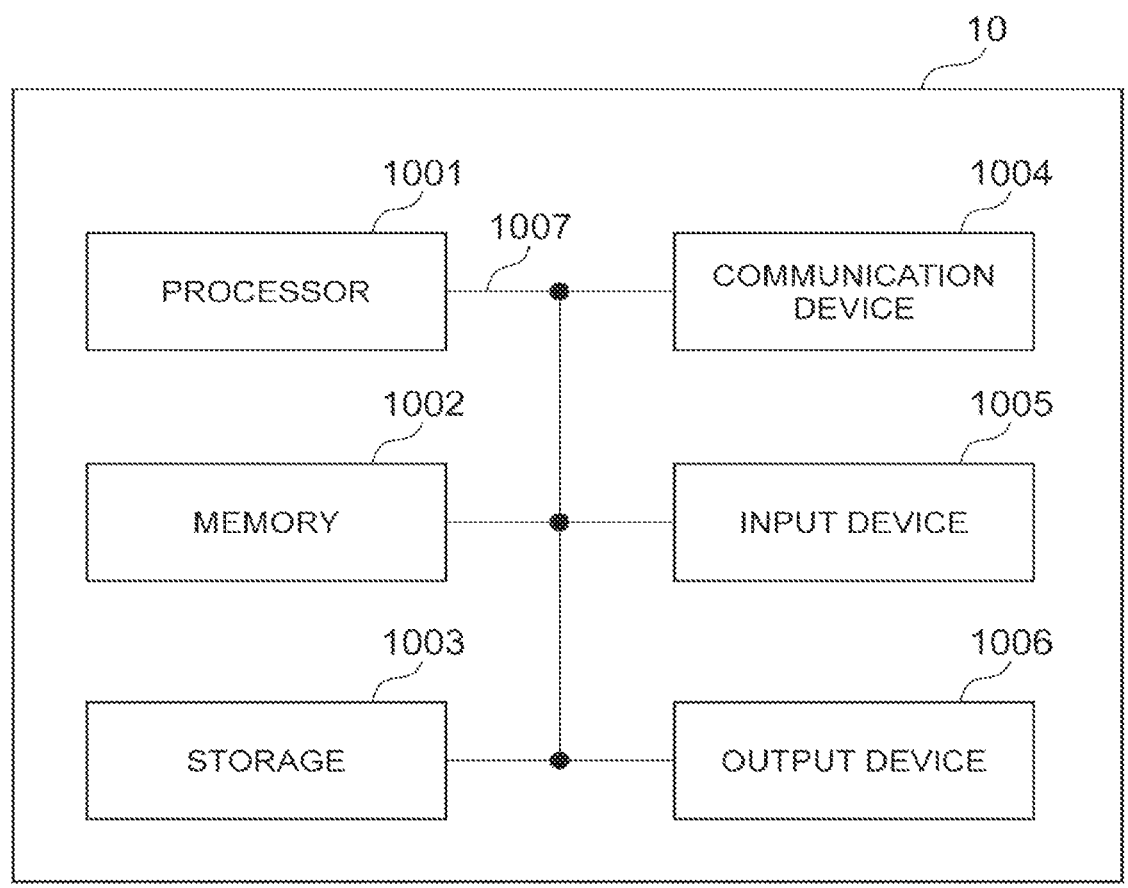
FIG. 10 is a block diagram illustrating an example of a hardware configuration of the pattern recognition device.

For example, the pattern recognition device 10 according to an embodiment of the present invention may function as a computer that performs the pattern recognition method of the present disclosure. FIG. 10 is a diagram illustrating an example of a hardware configuration of the pattern recognition device 10 according to the embodiment of the present disclosure. The pattern recognition device 10 described above may be physically configured as a computer device including a processor 1001, a memory 1002, a storage 1003, a communication device 1004, an input device 1005, an output device 1006, a bus 1007, and the like.

In the following description, the term "device" can be referred to as a circuit, a device, a unit, or the like. The hardware configuration of the pattern recognition device 10 may include one or a plurality of devices illustrated in FIG. 10, or may be configured without including some of the devices.

Each function in the pattern recognition device 10 is realized by loading predetermined software (a program) into hardware such as the processor 1001 or the memory 1002 so that the processor 1001 performs computation to control communication that is performed by the communication device 1004 or control at least one of reading and writing of data in the memory 1002 and the storage 1003.

The processor 1001, for example, operates an operating system to control the entire computer. The processor 1001 may be configured as a central processing unit (CPU) including an interface with peripheral devices, a control device, a computation device, a register, and the like.

Further, the processor 1001 reads a program (program code), a software module, data, or the like from at one of the storage 1003 and the communication device 1004 into the memory 1002 and executes various processes according to the program, the software module, the data, or the like. As the program, a program for causing the computer to execute at least some of the operations described in the above-described embodiment may be used. For example, the determination unit 18 may be realized by a control program that is stored in the memory 1002 and operated on the processor 1001, and other functional blocks may be realized similarly. Although the case in which the various processes described above are executed by one processor 1001 has been described, the processes may be executed simultaneously or sequentially by two or more processors 1001. The processor 1001 may be realized using one or more chips. The program may be transmitted from a network via an electric communication line.

The memory 1002 is a computer-readable recording medium and may be configured of, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store an executable program (program code), software modules, and the like in order to implement the pattern recognition method according to the embodiment of the present disclosure.

The storage 1003 is a computer-readable recording medium and may also be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a database including at least one of the memory 1002 and the storage 1003, a server, or another appropriate medium.

The communication device 1004 is hardware (a transmission and reception device) for performing communication between computers via at least one of a wired network and a wireless network and is also referred to as a network device, a network controller, a network card, or a communication module, for example. The communication device 1004 may include a high-frequency switch, a duplexer, a filter, a frequency synthesizer, and the like, for example, in order to realize at least one of frequency division duplex (FDD) and time division duplex (TDD).

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel).

Further, the respective devices such as the processor 1001 and the memory 1002 are connected by the bus 1007 for information communication. The bus 1007 may be configured using a single bus or may be configured using buses different between the devices.

Further, the pattern recognition device 10 may include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be implemented by at least one of these pieces of hardware.

Although the present embodiment has been described in detail above, it is apparent to those skilled in the art that the present embodiment is not limited to the embodiments described in the present disclosure. The present embodiment can be implemented as a modification and change aspect without departing from the spirit and scope of the present invention determined by description of the claims. Accordingly, the description of the present disclosure is intended for the purpose of illustration and does not have any restrictive meaning with respect to the present embodiment.

Notification of information is not limited to the aspect and embodiment described in the present disclosure and may be made by another method. For example, notification of information may be made by physical layer signaling (for example, downlink control information (DCI) or uplink control information (UCI)), upper layer signaling (for example, radio resource control (RRC) signaling, medium access control (MAC) signaling, or annunciation information (master information block (MIB) or system information block (SIB))), another signal, or a combination of them. Further, RRC signaling may be called an RRC message, and may be, for example, an RRC connection setup message or an RRC connection reconfiguration message.

A process procedure, a sequence, a flowchart, and the like in each aspect/embodiment described in the present disclosure may be in a different order unless inconsistency arises. For example, for the method described in the present disclosure, elements of various steps are presented in an exemplified order, and the elements are not limited to the presented specific order.

Information or the like can be output from an upper layer (or a lower layer) to the lower layer (or the upper layer). The information or the like may be input and output through a plurality of network nodes.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A determination may be performed using a value (0 or 1) represented by one bit, may be performed using a Boolean value (true or false), or may be performed through a numerical value comparison (for example, comparison with a predetermined value).

Each aspect/embodiment described in the present disclosure may be used alone, may be used in combination, or may be used by being switched according to the execution. Further, a notification of predetermined information (for example, a notification of "being X") is not limited to be made explicitly, and may be made implicitly (for example, a notification of the predetermined information is not made).

Software should be construed widely so that the software means an instruction, an instruction set, a code, a code segment, a program code, a program, a sub-program, a software module, an application, a software application, a software package, a routine, a sub-routine, an object, an executable file, a thread of execution, a procedure, a function, and the like regardless whether the software is called software, firmware, middleware, microcode, or hardware description language or called another name.

Further, software, instructions, information, and the like may be transmitted and received via a transmission medium. For example, when software is transmitted from a website, a server, or another remote source using wired technology (a coaxial cable, an optical fiber cable, a twisted pair, a digital subscriber line (DSL), or the like) and wireless technology (infrared rays, microwaves, or the like), at least one of the wired technology and the wireless technology is included in a definition of the transmission medium.

The information, signals, and the like described in the present disclosure may be represented using any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or an arbitrary combination of them.

Terms described in the present disclosure and terms necessary for understanding of the present disclosure may be replaced with terms having the same or similar meanings. For example, at least one of a channel and a symbol may be a signal (signaling). Further, a signal may be a message.

The terms "system" and "network" used in the present disclosure are used interchangeably.

Further, the information, parameters, and the like described in the present disclosure may be expressed using an absolute value, may be expressed using a relative value from a predetermined value, or may be expressed using another corresponding information. For example, wireless resources may be indicated by an index.

Names used for the above-described parameters are not limited names in any way. Further, equations or the like using these parameters may be different from those explicitly disclosed in the present disclosure. Since various information elements can be identified by any suitable names, the various names assigned to these various information elements are not limited names in any way.

The term "determining" used in the present disclosure may include a variety of operations. The "determining" can include, for example, regarding judging, calculating, computing, processing, deriving, investigating, search (looking up, search, or inquiry) (for example, search in a table, a database, or another data structure), or ascertaining as "determining". Further, "determining" can include regarding receiving (for example, receiving information), transmitting (for example, transmitting information), inputting, outputting, or accessing (for example, accessing data in a memory) as "determining". Further, "determining" can include regarding resolving, selecting, choosing, establishing, comparing or the like as "determining". That is, "determining" can include regarding a certain operation as "determining". Further, "determining" may be read as "assuming", "expecting", "considering", or the like.

The description "based on" used in the present disclosure does not mean "based only on" unless otherwise noted. In other words, the description "based on" means both of "based only on" and "based at least on".

Any reference to elements using designations such as "first," "second," or the like used in the present disclosure does not generally limit the quantity or order of those elements. These designations may be used in the present disclosure as a convenient way for distinguishing between two or more elements. Thus, the reference to the first and second elements does not mean that only two elements can be adopted there or that the first element has to precede the second element in some way.

When "include", "including" and transformation of them are used in the present disclosure, these terms are intended to be comprehensive like the term "comprising". Further, the term "or" used in the present disclosure is intended not to be exclusive OR.

In the present disclosure, for example, when articles such as a, an, and the in English are added by translation, the present disclosure may include that nouns following these articles are plural.

In the present disclosure, a sentence "A and B are different" may mean that "A and B are different from each other". The sentence may mean that "each of A and B is different from C". Terms such as "separate", "coupled", and the like may also be interpreted, similar to "different".

REFERENCE SIGNS LIST

10: Pattern recognition device
11: First recognition unit
12: Second recognition unit
13: Acquisition unit
14: First model generation unit
15: Second model generation unit
16: Third model generation unit
17: Calculation unit
18: Determination unit
19: Output unit
M1: First model (learned model)
M2: Second model
M3: third model

The invention claimed is:

1. A pattern recognition device comprising:
processing circuitry configured to
receive input data as image data;
perform pattern recognition to recognize an object included in the image data;
acquire a plurality of recognition candidates obtained by the pattern recognition and having respective recognition scores indicating certainty of recognition;
calculate an evaluation value obtained by quantifying a possibility of a second recognition candidate being correct answer data corresponding to the input data on the basis of a feature quantity regarding a first recognition candidate and the second recognition candidate, for each pair of the first recognition candidate that is a recognition candidate having a highest recognition score and the second recognition candidate that is another recognition candidate among the plurality of recognition candidates;
determine a final recognition result from among the plurality of recognition candidates on the basis of the evaluation value for each of the calculated second recognition candidates; and
output a pre-stored image corresponding to the final recognition result as the recognized object,
wherein the pattern recognition includes a first pattern recognition and a second pattern recognition different from the first pattern recognition,
the plurality of recognition candidates acquired including a recognition candidate obtained by the first pattern recognition for the input data and a recognition candidate obtained by the second pattern recognition for the input data,
the first pattern recognition is a scheme for recognizing an object included in the image data on the basis of a feature quantity extracted from a grayscale image obtained by performing grayscale conversion on the image data, and the second pattern recognition is a scheme for recognizing the object included in the image data on the basis of a feature quantity including color information of the image data.

2. The pattern recognition device according to claim 1, wherein the processing circuitry is configured to:

extract a third recognition candidate, the third recognition candidate being a candidate for the final recognition result, on the basis of the evaluation value for each of the calculated second recognition candidates;

calculate a second evaluation value obtained by quantifying a validity of the third recognition candidate being set as the final recognition result on the basis of feature quantities regarding the first recognition candidate and the third recognition candidate when the third recognition candidate is different from the first recognition candidate, and determine whether or not the third recognition candidate is set as the final recognition result on the basis of the second evaluation value.

3. The pattern recognition device according to claim 1, wherein the processing circuitry is configured to execute machine learning using first learning data in which a feature quantity regarding two recognition candidates obtained by the pattern recognition for recognition target data are explanatory variables and an index value indicating whether one of two recognition candidates is correct answer data corresponding to the recognition target data is an objective variable, to generate a first model, and acquire, for each pair, an output value obtained by inputting the feature quantity regarding the first recognition candidate and the second recognition candidate serving as the one recognition candidate to the first model, as the evaluation value.

4. The pattern recognition device according to claim 2, wherein the processing circuitry is configured to execute machine learning using first learning data, in which a feature quantity regarding two recognition candidates obtained by the pattern recognition for recognition target data are explanatory variables and an index value indicating whether one of two recognition candidates is correct answer data corresponding to the recognition target data is an objective variable, to generate a first model, generate a second model, acquire a plurality of recognition candidates obtained by the pattern recognition for data serving as the recognition target, and each having a recognition score indicating the certainty of recognition, acquire, for each pair of a fourth recognition candidate that is a recognition candidate having the number one recognition score and a fifth recognition candidate that is another recognition candidate among the plurality of recognition candidates, an evaluation value for each of the fifth recognition candidates by inputting a feature quantity regarding the fourth recognition candidate and the fifth recognition candidate serving as the one recognition candidate to the first model, extract a sixth recognition candidate that is a candidate for the final recognition result on the basis of the evaluation value of each of the fifth recognition candidates, generate second learning data, in which the feature quantity regarding the fourth recognition candidate and the sixth recognition candidate is an explanatory variable and an index value indicating whether or not the sixth recognition candidate is correct answer data is an objective variable, when the sixth recognition candidate is different from the fourth recognition candidate, execute machine learning using the second learning data to generate the second model, and acquire, as the second evaluation value, an output value obtained by inputting a feature quantity regarding the first recognition candidate and the third recognition candidate to the second model when the third recognition candidate is different from the first recognition candidate.

5. A method, implemented by processing circuitry of a pattern recognition device comprising:

receiving input data as image data;

performing pattern recognition to recognize an object included in the image data;

acquiring a plurality of recognition candidates obtained by the pattern recognition and having respective recognition scores indicating certainty of recognition;

calculating an evaluation value obtained by quantifying a possibility of a second recognition candidate being correct answer data corresponding to the input data on the basis of a feature quantity regarding a first recognition candidate and the second recognition candidate, for each pair of the first recognition candidate that is a recognition candidate having a highest recognition score and the second recognition candidate that is another recognition candidate among the plurality of recognition candidates;

determining a final recognition result from among the plurality of recognition candidates on the basis of the evaluation value for each of the calculated second recognition candidates; and outputting a pre-stored image corresponding to the final recognition result as the recognized object, wherein the pattern recognition includes a first pattern recognition and a second pattern recognition different from the first pattern recognition, the plurality of recognition candidates acquired including a recognition candidate obtained by the first pattern recognition for the input data and a recognition candidate obtained by the second pattern recognition for the input data, the first pattern recognition is a scheme for recognizing an object included in the image data on the basis of a feature quantity extracted from a grayscale image obtained by performing grayscale conversion on the image data, and the second pattern recognition is a scheme for recognizing the object included in the image data on the basis of a feature quantity including color information of the image data.

6. A non-transitory computer-readable medium that stores a program that, when executed by processing circuitry of a pattern recognition device, causes the pattern recognition device to perform a method comprising:

receiving input data as image data;

performing pattern recognition to recognize an object included in the image data;

acquiring a plurality of recognition candidates obtained by the pattern recognition and having respective recognition scores indicating certainty of recognition;

calculating an evaluation value obtained by quantifying a possibility of a second recognition candidate being correct answer data corresponding to the input data on the basis of a feature quantity regarding a first recognition candidate and the second recognition candidate, for each pair of the first recognition candidate that is a recognition candidate having a highest recognition score and the second recognition candidate that is another recognition candidate among the plurality of recognition candidates;

determining a final recognition result from among the plurality of recognition candidates on the basis of the evaluation value for each of the calculated second recognition candidates; and outputting a pre-stored image corresponding to the final recognition result as the recognized object, wherein the pattern recognition includes a first pattern recognition and a second pattern recognition different from the first pattern recognition, the plurality of recognition candidates acquired including a recognition candidate obtained by the first pattern recognition for the input data and a recognition candidate obtained by the second pattern recognition for the input data, the first pattern recognition is a scheme for recognizing an object included in the image data on the basis of a feature quantity extracted from a grayscale image obtained by performing grayscale conversion on the image data, and the second pattern recognition is a scheme for recognizing the object included in the image data on the basis of a feature quantity including color information of the image data.

* * * * *